United States Patent

[11] 3,551,707

[72] Inventor Dieter Seitzer
Zurich, Switzerland
[21] Appl. No. 690,592
[22] Filed Dec. 14, 1967
[45] Patented Dec. 29, 1970
[73] Assignee International Business Machines Corporation
Armonk, N.Y.
a corporation of New York
[32] Priority Dec. 22, 1966
[33] Switzerland
[31] No. 18382/66

[54] COUPLED TRANSMISSION LINES ARRANGEMENT
6 Claims, 6 Drawing Figs.

[52] U.S. Cl. .......... 307/317, 317/234; 333/7
[51] Int. Cl. .......... H01l 19/00, H01p 5/12
[50] Field of Search .......... 333/7, 10, 81; 317/234, 31; 307/320, 303, 239, 317

[56] References Cited
UNITED STATES PATENTS
2,679,632 5/1954 Bellows, Jr. .......... 333/10
3,0175,585 1/1962 Luke .......... 333/10X
3,432,778 3/1969 Ertel .......... 317/234X

*Primary Examiner*—Donald D. Forrer
*Assistant Examiner*—B. P. Davis
*Attorneys*—Hanifin and Jancin and Bernard N. Wiener

ABSTRACT: This disclosure provides a semiconductor diode, e.g., Schottky-barrier diode, coupled transmission lines arrangement wherein the electrodes of the coupling diode form input and output transmission lines. The transmission lines are arranged and coupled in such a way as to provide a directional coupling system which includes the parasitic elements of the coupling diode for preventing the occurrence of noise signals at the output terminal of the output transmission line when the coupling diode is backward biased. When the coupling diode is forward biased, an input pulse at the input of one transmission line is controllably transmitted with enhanced characteristics to the output of the other transmission line.

Through practice of the disclosed coupled transmission lines arrangement, noise signals caused by parasitic elements at high frequencies are suppressed. The arrangement is operable in the picosecond range and is useful in circuits employed for increasing the pulse slope steepness. It is also useful in suppressor and limiter circuits.

INVENTOR.
DIETER SEITZER

BY
Bernard N. Wiener
ATTORNEY

COUPLED TRANSMISSION LINES ARRANGEMENT

This invention relates generally to coupled transmission lines; and, more particularly, it relates to directionally and nondirectionally coupled transmission lines.

Attempts have been made in the past to couple directionally transmission lines, but it was difficult to couple these lines in such a way that noise signals caused by parasitic elements were suppressed. The transmission lines coupling arrangement of this invention can be employed in circuits known as suppressors or high pass filters, i.e., in a circuit in which only those voltages that exceed a certain threshold appear at its output. Such circuits may be used for pulse width reduction of nonrectangular pulses, i.e., only the pulse peaks whose time basis is shorter than the initial signal are transmitted. When amplifying this short output signal, an increased steepness of the pulse slopes is obtained; and the rise time is shortened.

In known suppressor circuits, lumped diodes are employed which, at very high frequencies, cause noise signals due to the inevitable parasitic elements, i.e., the junction and package capacitances and the interconnection lead and package inductances. These noise signals appearing at the output of the circuit are most critical when the diode is backward biased. A considerable reduction in the capacitance is possible which produces a very short pulse of about 5 picoseconds (1 psec. = $10^{-12}$ sec.). However, a corresponding reduction of the inductance has not been possible with lumped elements. Attempts were made to make use of the series-resonance of the inductance and the capacitance. A pulse width of about 200 psec. can be obtained; but, in view of the frequency dependent behavior of the resonant circuit, satisfactory operation is restricted to a relatively narrow bandwidth.

The transmission lines coupling arrangement of this invention may also be employed in limiter circuits in which only those voltages not exceeding a threshold determined by a bias voltage applied to the diode appear at the output.

It is an object of this invention to provide a transmission lines coupling arrangement in which the noise signals caused by parasitic elements at high frequencies are suppressed.

It is another object of this invention to provide a diode coupled transmission lines arrangement operable in the picosecond range, which is useful for circuits employed for pulse width reduction or for increasing the pulse slope steepness as well as in suppressor and limiter circuits.

These objects are achieved by the use of a diode whose electrodes form, together with at least one return line, input and output transmission lines arranged and coupled in such a way as to provide a directional coupling system which includes the parasitic elements of the coupling diode for preventing the occurrence of noise signals at the output terminal of the output transmission line when the coupling diode is backward biased. Therefore, the practice of the invention provides a coupled transmission lines arrangement which comprises a pair of transmission lines and voltage sensitive means coupling the transmission lines having one state for directionally coupling the transmission lines and another state for nondirectionally coupling the transmission lines. In a preferred embodiment of the invention, the voltage sensitive means is a semiconductor diode, and in a specific design of the embodiment, is a Schottky-barrier diode formed between a semiconductor and a metal.

The foregoing and other objects, features and advantages of the invention will be apparent from the following more particular description of a preferred embodiment of the invention, as illustrated in the accompanying drawings.

Figure 1:
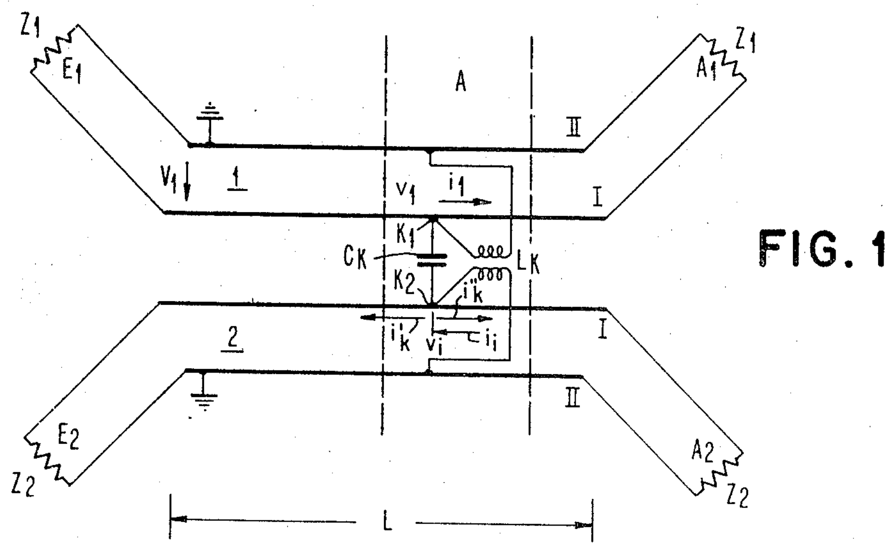
FIG. 1 is a schematic representation of two uniformly coupled transmission lines.

Referring to FIG. 1, two transmission lines 1 and 2 are shown coupled over the length L, both of which consist of a forward line I and a return line II. As indicated, both return lines can be grounded, and the lines may also be identical. Within the coupling region L, there exists capactive coupling over coupling capacitance $C_K$ as well as inductive coupling over coupling inductance $L_K$ at any point of the region. In section A of the drawing, this is schematically represented for a given point ($K_1$, $K_2$).

By choosing proper line parameters, the so-called directional coupling can be achieved to provide the following function: a signal $V_1$ supplied to terminal $E_1$ of input transmission line 1 occurs only at terminal $E_2$ of output transmission line 2, and the output signal at terminal $A_2$ equals zero. The conditions required for directional coupling are developed below with the simplifying assumptions that the coupled transmission lines are free of losses and that the lines are matched with their characteristic impedances $Z_1$ and $Z_2$, respectively, thus preventing reflection. In addition, the coupling has to be rather weak, i.e., $$\frac{1}{jwC_K} >> Z_1, Z_2$$

and $$jwL >> Z_1, Z_2$$

Input voltage $V_1$ causes a voltage $V_1$ at point $K_1$ which, via capacitance $C_K$, induces two currents $i_k'$ and $i_k''$ and in line 2 flowing from point $K_2$ in both directions. These currents can be determined by the following equation:

$$|i_K'| = |i_K''| \approx \frac{1}{2} \cdot jwC_K \cdot V_1 \qquad (1)$$

This approximation formula is exact under the assumption $$\frac{1}{jwC_K} >> Z_1, Z_2$$

Furthermore, current $i_1$ flowing in line 1 induces via coupling inductance $L_K$ a voltage $v_i$ in line 2. This voltage in turn causes a current $i_i$ flowing in a direction opposite to that of current $ik''$. The induced voltage $$V_i = jwL_K' i_1 \qquad (2)$$

Under the assumption that $jwL_K >> Z_1$, $Z_2$ the equation for current $i_i$ is obtained as $$i_i = \frac{jwL_K' i}{2Z_2} \qquad (3)$$

For directional coupling defined by the requirement that the output signal at terminal $A_2$ remains zero, the following condition must be fulfilled: $|i_K''| = |i_i|$ $Z_1 = \frac{v_1}{i_1}$ and equating (1) and (3) the required directional coupling condition can be written as $$Z_1 \cdot jwC_K' i = \frac{1}{Z_2} \cdot jwL_K' i_1$$

or $$Z_1 \cdot Z_2 = \frac{L_K}{C_K} \qquad (4)$$

The expression generally valid for the characteristic impedance Z of a transmission line is $Z = \sqrt{\frac{L}{C}}$. Using this formula, equation (4) can be expressed in the following way:

$$Z_1 \cdot Z_2 = Z_K^2 \qquad (5)$$

with $Z_K$ = characteristic impedance of the transmission line formed by the two forward lines I of coupled transmission lines 1 and 2.

A different analysis of the coupling between two coupled transmission lines is given in the article "Transmission Line Directional Couplers for Very Broad-Band Operation" published by R. Levy in the Proceedings of the I.E.E., Vol. 112, No. 3, Mar. 1965. This analysis is based on the fact that two coupled lines may support two TEM modes known as even and odd modes. The even mode is caused by in-phase signals applied to terminals $E_1$ and $E_2$, and the odd mode is caused by out-of-phase signals (phase difference 180°) applied to these terminals. Under this condition, the analysis of two coupled lines is simplified, as it can be reduced for each of the two modes to a relatively simple equation for a single line, while the behavior of coupled lines with respect to both TEM modes can be obtained by superposition of the two resulting equations.

Based on these considerations and under the condition that directional coupling requirements are fulfilled and that a voltage $V_1$ is applied to terminal $E_1$, the following equations are obtained for the voltages emerging at the line terminals due to the coupling:

$$V_{E_1}=0 \qquad (6)$$

$$V_{E_2}=V_1\cdot\frac{jk_1\cdot\sin\Theta}{2\cdot\cos\Theta+jk_2\cdot\sin\Theta} \qquad (7)$$

$$V_{A_1}=V_1\cdot\frac{2}{2\cdot\cos\Theta+jk_2\cdot\sin\Theta} \qquad (8)$$

$$V_{A_2}=0 \qquad (9)$$

In these equations, $k_1$ and $k_2$ are constants determined by the line parameters and $\Theta$ represents the electrical length of the coupled lines which can be expressed by the following equation:

$$\Theta=\frac{2\pi L}{\lambda}$$

with:

$\lambda$=wavelength $L$=coupling length of the transmission lines.

From equation (9), it is apparent that the signal at output terminal $A_2$ is theoretically zero for all frequencies, i.e., the directional coupling effect is frequency independent. Deviations from this ideal behavior are caused by factors which have been neglected in the development of the equations, i.e., mainly by the losses occurring on the transmission lines and in practical embodiments by the fact that a perfect match of the lines with their characteristic impedances cannot be obtained for all waves and frequencies. In addition, it has been assumed that no higher order modes occur. Equations (7) and (8) show that the phase difference between the waves occurring at terminals $E_2$ and $A_1$ is 90° at all frequencies. The coupling to terminal $E_2$ and the resulting signal $V_{E2}$ is a maximum for $\sin\Theta=1$, i.e., when the length of the coupled line is an odd multiple of a quarter of a wavelength. $V_{E2}$ becomes zero when the line length is an integral multiple of a half-wavelength.

Figure 2A:
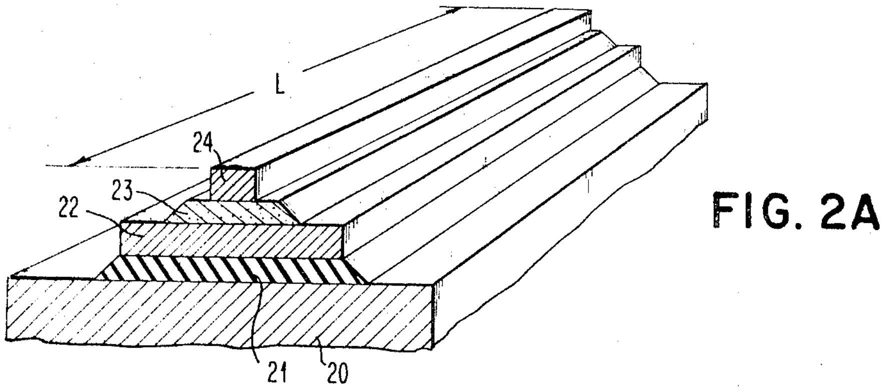
FIG. 2A is a schematic representation of a diode coupled transmission lines arrangement in accordance with one embodiment of this invention.

FIG. 2A shows a schematic representation of a preferred embodiment of this invention which utilizes a a coupling diode which preferably consists of a known Schottky-barrier semiconductor diode. Electrode 22 connected to one of the surfaces of semiconductor 23 forms a Schottky-barrier together with the semiconductor, while second electrode 24 connected to the opposite surface of the semiconductor 23 forms an ohmic contact. The semiconductor consists of $n$-type material, electrode 22 serves as anode, and electrode 24 serves as cathode. In contrast with conventional semiconductor diodes, the one shown in FIG. 2A exhibits a considerable extension L orthogonal to the current path. In essence, the coupling diode actually consists of an infinite number of diode elements arranged in parallel. The coupling diode is placed on a metallic substrate 20. In the described embodiment the electrodes are arranged on top of each other with respect to the substrate from which they are separated by an isolating or insulating layer 21. They could also be arranged side by side. Other embodiments in which the diode is placed between two metallic layers or substrates are also feasible.

In the embodiment shown in FIG. 2A, the electrodes and the substrate 20 form two transmission lines: the input line consisting of anode electrode 22 and substrate 20, and the output line consisting of cathode electrode 24 and substrate 20. These transmission lines are arranged and coupled in such a way that they act as a directional coupler as long as the semiconductor diode coupling the two lines is backward biased. The requirements for such behavior are outlined in the explanation of the directional coupling effect given in connection with FIG. 1. It is essential that the parasitic elements are considered as being part of the coupled lines, i.e., they have to be taken into account when calculating the line parameters.

When the directional coupling conditions expressed in equation (5) are fulfilled, such a coupling diode arrangement provides for the following function: as long as the diode is backward biased, noise signals coupled from the input line into the output line via the parasitic elements of the diode are directed only to one terminal of the output line while the noise signal at the opposite end of this line is zero.

In the following there is presented a detailed description of the embodiment shown in FIG. 2A. The diode coupled transmission lines arrangement is composed of a plurality of layers arranged on a metallic substrate 20 which, in the embodiment shown, consists of aluminum. Directly on top of the substrate is a thin $SiO_2$ isolating layer 21 separating the first metal layer 22 consisting of gold from the substrate. Arranged on this metal layer is a thin semiconductor layer 23 of $n$-type silicon which in turn is covered by a second aluminum layer 24. All layers can be produced with known evaporation techniques and with the aid of masks and etching methods. The materials mentioned above are only those used in the preferred embodiment; they may be replaced by other suitable materials. The semiconductor layer may, for instance, consist of gallium arsenide, germanium, or indium antimonide. An essential requirement is that metal 22 forms a Schottky-barrier in the semiconductor 23 and that the connection of the semiconductor material with metal 24 results in an ohmic contact. The device then constitutes a Schottky-barrier diode with anode electrode 22 and cathode electrode 24.

The diode coupled transmission lines arrangement exhibits an extension L orthogonal to the current path. This length L is not critical; in the embodiment described, it is chosen to be 1 mm. Considerations regarding the other dimensions, especially the thickness of the different layers, are given below. As already mentioned, diode electrodes 22 and 24 form together with substrate 20 two transmission lines coupled over the length L. The input transmission line corresponding to the pair of lines designated as 1 in FIG. 1 consists of anode electrode 22 and substrate 20, and the pair of lines designated in FIG. 1 as 2 consists of cathode electrode 24 and substrate 20.

As demonstrated above, the characteristic impedance $Z_K$ of the transmission line, formed by electrodes 22 and 24 and referred to as coupling line, has to be taken into account when calculating the characteristic impedances $Z_1$ and $Z_2$ and for determining suitable parameters and dimensions required in order to achieve directional coupling. For directional coupling, it is required that $$Z_1\cdot Z_2=Z_K^2 \qquad (5)$$

Several equations generally applicable for the determination of characteristic impedances and used as a basis for further calculations are given below. These equations are valid for transmission lines consisting of a conductor having a width $b$ and a thickness $d$ and a flat areal return line, e.g., a metallic substrate.

$$Z_o=\sqrt{\frac{\mu_o}{\epsilon_o}} \quad (10)$$

$$Z=\sqrt{\frac{\mu_o}{\epsilon_o}}\cdot\sqrt{\frac{\mu_r}{\epsilon_r}\cdot\frac{h}{b^1}}=Z_o\sqrt{\frac{\mu_r}{\epsilon_r}\cdot\frac{h}{b^1}} \quad (11)$$

$$Z=\sqrt{\frac{L}{C}} \quad (12)$$

$$L=\mu_o\mu_r\cdot\frac{h}{b^1} \quad (13)$$

$$C=\epsilon_o\cdot\epsilon_r\cdot\frac{b^1}{h} \quad (14)$$

$$b'=b+d \quad (15)$$

Equations (11), (13), and (14) are approximation formulae valid for $b'>>h$. In these equations the following symbols are used:

- $z_0$=characteristic impedance of vacuum,
- $\mu_0$=permeability of vacuum,
- $\mu_r$=relative permeability,
- $\epsilon_0$=dielectric constant of vacuum,
- $\epsilon_r$=relative dielectric constant,
- $h$=distance between conductor and return line,
- $b'$=effective width of the conductor taking the coupling between the side faces of the conductor and the return line into account,
- $L$=coupling inductance between conductor and return line,
- $C$=coupling capacitance between conductor and return line.

Equations for the characteristic impedances $Z_1$, $Z_2$, and $Z_k$ of three coupled transmission lines of the embodiment shown in FIG. 2A are given below. The characteristic impedance of input transmission line 1 is:

$$Z_1=\sqrt{\frac{L_1}{C_1}} \quad (16)$$

with:

- $L_1$=coupling inductance between conductors 20 and 22,
- $C_1$=coupling capacitance between conductors 20 and 22.

The characteristic impedance of the coupling line is:

$$Z_K=\sqrt{\frac{L_K}{C_K+C_D}}=\sqrt{\frac{L_K}{C_{K'}}} \quad (17)$$

with:

- $L_K$=coupling inductance between conductors 22 and 24,
- $C_K$=coupling capacitance between conductors 22 and 24,
- $C_D$=barrier layer capacitance of the diode arranged between conductors 22 and 24,
- $C_{K'}=(C_D+C_K)$.

The characteristic impedance of output transmission line 2 is:

$$Z_2=\sqrt{\frac{L_2}{C_2}}=\sqrt{\frac{(L_1+L_K)(C_1+C_K^1)}{C_1\cdot C_K^1}} \quad (18)$$

with:

- $L_2$=coupling inductance between conductors 20 and 22,
- $C_2$=coupling capacitance between conductors 20 and 22.

In equation (18) the characteristic impedance of the output line is expressed by the parameters of the input transmission line and those of the coupling line. This is possible for the described arrangement, since the coupling inductance $L_2$ of the output transmission line corresponds to the series arrangement of coupling inductances $L_1$ and $L_K$ of input and coupling line. The same consideration applies to the coupling capacitance, i.e., $C_2$ corresponds to capacitances $C_1$ and $C_K$ arranged in series.

Figure 2B:
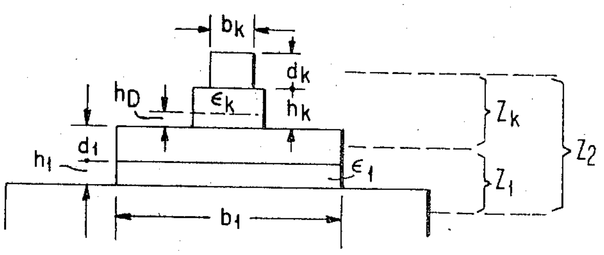
FIG. 2B is a schematic representation of the arrangement of FIG. 2A for indicating the coupling diode parameters.

By using the designations given in FIG. 2B and inserting (16), (17), and (18) in equation (5), there results the following equation:

$$\sqrt{\frac{L_1}{C_1}}\cdot\sqrt{(L_1+L_K)\cdot\frac{(C_1+C_K^1)}{C_1\cdot C_k^1}}=\frac{L_K}{C_K^1}$$

and consequently:

$$\frac{L_1}{C_1}\cdot\sqrt{\left(1+\frac{L_K}{L_1}\right)\left(1+\frac{C_1}{C_K^1}\right)}=\frac{L_k}{C_K^1} \quad (19)$$

Taking equations (10), (12), (13), and (14) into consideration, one obtains:

$$\frac{1}{\epsilon_{r_1}}\cdot\frac{h_1^2}{b_1^{1,2}}\cdot\sqrt{\left(1+\frac{h_K}{h_1}\cdot\frac{b_1^1}{b_K'}\right)\left(1+\frac{\epsilon_{ri}}{\epsilon_{rk}}\cdot\frac{b^1}{h_1\cdot b_k^1\left(\frac{1}{h_k}+\frac{1}{h_D}\right)}\right)}=\frac{h_k}{\epsilon_{rk}\cdot b_k^{1,2}\cdot\left(\frac{1}{h_k}+\frac{1}{h_D}\right)} \quad (20)$$

with:

- $h_D$=effective thickness of diode barrier layer (about $0.3\mu$).

Further calculations not given in detail prove that equation (20) including the requirements for directional coupling is satisfied with sufficient accuracy when choosing the following dimensions and material constants:

$h_1=4\mu$; $d_1=5\mu$; $b_1=90\mu$; $\epsilon_{r1}=4(SiO_2)$; $h_K=1\mu$; $d_K=2\mu$; $b_K=2\mu$; $\epsilon_{rk}=10$(Si); $h_C=0.3\mu$.

The foregoing table shows that the required dimensions can be obtained with known production methods. Inserting these values in equations ((16), (17), and (18) results in the following characteristic impedances:

$Z_1=8\Omega$
$Z_2=26\Omega$
$Z_K=14\Omega$.

Figure 3A:
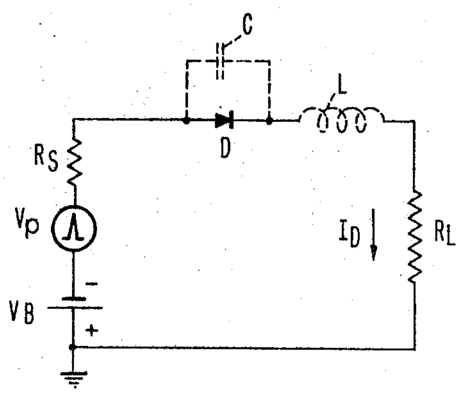
FIG. 3A is a circuit diagram of a suppressor circuit employing lumped diodes.
Figure 3B:
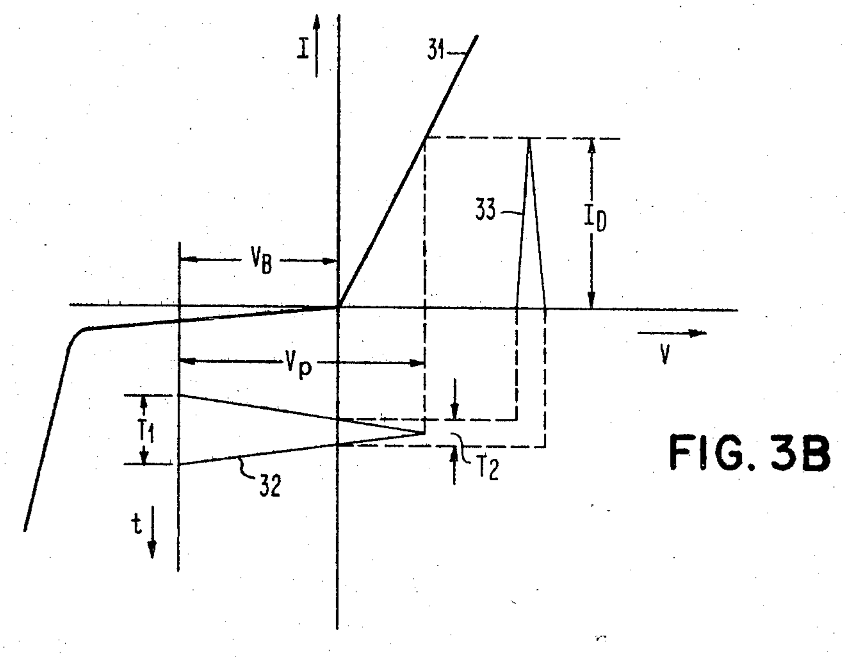
FIG. 3B is a representation of the operation of the circuit of FIG. 3A with the aid of the coupling diode characteristic.

For a better understanding of the advantages which can be achieved in a suppressor circuit when employing the coupled transmission lines arrangement in accordance with this invention, a known suppressor circuit consisting of conventional lumped elements is described with the aid of FIG. 3A and 3B. FIG. 3A shows a circuit diagram consisting essentially of a pulse voltage source $v_p$, a bias battery $V_B$, a semiconductor diode D, and load resistor $R_L$. The parasitic elements of the coupling diode are indicated by dotted symbols, capacitance C represents the stray capacitance and the barrier layer capacitance, while inductance L represents the inductance of the connection leads. The battery provides for a backward bias voltage $V_B$ for diode D. The operation of the circuit shown in FIG. 3A will now be explained with the aid of FIG. 3B which shows the current voltage characteristic 31 of the coupling diode. For simplicity, this characteristic is assumed to consist of linear sections. To begin with, the effect caused by the critical parasitic elements at high frequencies is neglected for this consideration. The polarity of the pulse voltage $v_p=f(t)$, with the maximum value $V_p$ (curve 32) is opposite to that of the bias voltage $V_B$. These voltages are superimposed. The coupling diode remains nonconducting as long as the voltage $v_p$ is smaller than the bias voltage, i.e., $v_p < V_B$, and the current flowing through load resistor $R_L$ equals zero. The diode becomes conducting only during time interval $T_2$, which is shorter than the time basis $T_1$ of the initial pulse and an output pulse shorter than the pulse supplied by the pulse source is obtained at resistor $R_L$. However, output signal 33, is reduced in amplitude. It may be amplified in a subsequent amplifier circuit, not shown in FIG. 3A, so that the amplified output signal eventually provides for a shorter pulse with an increased pulse slope steepness. As mentioned above, this consideration is valid only for relatively low frequencies at which only neglectable noise signals are caused by the parasitic elements. In addition, the triangular output pulse 33 shown in FIG. 3B in fact cannot be realized, as the coupling diode characteristic departs from the ideal linear curve assumed in FIG. 3B. However, this is allowable for a general consideration.

At high frequencies, the parasitic elements cause a considerable distortion of the output pulse. Mainly, during the time intervals in which the pulse voltage is smaller than the value of the bias voltage, i.e., $v_p < V_B$, noise signals preceeding and following the output pulse occur, and a perfect pulse width reduction from $T_1$ to $T_2$ is not obtained. The influence of the different parasitic elements are not explained in detail. Only the obvious influence of the parasitic elements forming a capacitance C parallel to the diode is mentioned which provides for a current path for noise signals appearing at load resistor $R_L$ when the diode is backward biased.

The noise signals which occur in conventional suppressor circuits mainly at high frequencies can be eliminated by employing a diode coupled transmission lines arrangement as described in connection with FIG 2A. This is due to the directional coupling effect of the coupling diode which is effective as long as the diode is backward biased, i.e., during those time intervals when the noise signals are most critical.

Figure 4:
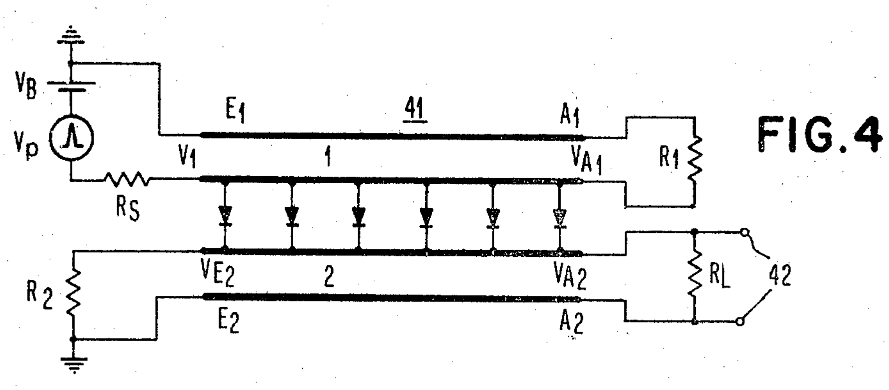
FIG. 4 is a circuit diagram representation of a suppressor circuit utilizing diode coupled transmission lines in accordance with this invention.

FIG. 4 shows a circuit diagram of a suppressor circuit employing a coupling diode according to FIG. 2A. The diode coupled transmission lines arrangement is represented by the electrical equivalent symbol 41. The pairs of lines forming the transmission lines are represented by heavy lines, and the practically infinite number of diode elements arranged in parallel are indicated by conventional diode symbols. The circuitry in FIG. 4 shows an input and an output circuit. The input circuit consists essentially of transmission line 1 to which a bias battery $V_B$, a pulse source $v_p$, and resistors $R_1$ and $R_S$ are connected. The output circuit is formed by transmission line 2 connected to resistors $R_2$ and $R_L$. The latter resistors as well as resistors $R_1$ and $R_S$ serve as matching resistors for the transmission lines. The output signal is obtained at terminals 42. As long as the coupling diode is backward biased, the input and output circuits are connected only through the coupling between the two transmission lines, whereas the circuits are directly connected via the coupling diode as soon as the coupling diode becomes conductive.

The operation of the circuit of FIG. 4 is described below. Whenever a pulse with high but not infinite slope steepness is applied by the pulse source to terminal $E_1$, the coupling diode remains nonconducting for a short period of time and noise signals are coupled into transmission line 2 by parasitic elements and the coupling between transmission lines 1 and 2. However, the coupling diode whose parasitic elements are part of the coupled transmission lines arrangement acts as directional coupler for these noise signals which consequently arrive only at resistor $R_2$ but not at load resistor $R_L$. Connection lead inductances present when lumped diodes are used do not occur in the described circuit arrangement, provided the coupled transmission lines arrangement is connected with the other circuit elements via matching transmission lines preventing any reflection.

Diode coupled transmission lines arrangement 41 becomes conducting as soon as the pulse voltage overcomes the bias voltage, i.e., the parasitic elements are short circuited, and the diode provides a low resistive connection to load resistor $R_L$. The pulse peak overcoming the bias voltage appears at output terminals 42. The input signal is conveyed not only to resistor $R_L$ but also to resistors $R_1$ and $R_2$. Therefore, the amplitude of the output signals is reduced; and it depends essentially on the ratio of the resistors mentioned and on the internal resistor $R_S$ of the pulse source. As long as the coupling diode is conducting, directional coupling does not occur; but it becomes effective again as soon as the pulse voltage drops below the bias voltage.

From the foregoing consideration and from equation (9) which does not indicate any frequency dependence, it would appear that the directional coupling effect of the coupling diode is frequency independent. It has already been emphasized that such a behavior cannot be expected in view of the losses occurring on the lines and in view of the different phase velocities of the odd and even modes, which in turn cause different electrical lengths of the coupled transmission lines for these modes. However, in practice, a very large bandwidth can be obtained even within the gigacycle range, i.e., for pulses having a width of only a few picoseconds. The noise signals remain very small for a frequency range of about one octave.

The output voltage $V_{E2}$ and, to a lesser degree, the voltage $V_{A2}$ depend on the electrical length of the coupled transmission lines, respectively, on the frequency. This becomes clear through consideration of equations (7) and (8). This behavior of the diode coupled transmission lines arrangement of this invention has little practical importance for its application in the described suppressor circuit.

In order to use the circuit shown in FIG. 4 as a limiter circuit, only small changes are required. These changes involve short-circuiting terminal $A_2$ and using the resistor $R_1$ connected to terminal $A_1$ as an output resistor from which the output signal provided by the circuit can be taken and applied to subsequent circuits, not shown.

In a limiter circuit only those voltages of an input signal $v_p p = v(t)$ not exceeding a predetermined threshold appear the output of the circuit. In conventional arrangements this function is achieved by using a diode to which a threshold voltage is applied and which acts as a short circuit for voltages exceeding the threshold. In very short-pulse applications the parasitic elements of conventional lumped diodes cause similar noise problems as explained in connection with the suppressor circuit.

In limiter circuits input voltages below the threshold value should appear at the output unchanged; and at very high frequencies, this is prevented by the diode capacitance forming an undesired current path to ground. When a coupled transmission lines arrangement according to this invention is employed, the parasitic elements are part of the transmission line system; and an undisturbed output signal only reduced in amplitude is obtained. The output voltage $V_{A1}$ is given by equation (8):

$$V_{A_1} = V_1 \cdot \frac{2}{2 \cdot \cos \Theta + jk_2 \cdot \sin \Theta} \qquad (8)$$

In case the characteristic impedances of the transmission lines are equal for odd and even modes at all frequencies; the output voltage is $V_{A_1} = \frac{V_1}{2}$. For input voltages exceeding the threshold, the coupling diode represents a short circuit, and the output voltage of the limiter circuit is limited to the threshold independent of the input voltage.

The coupling diode coupled transmission lines arrangement of this invention has been explained by using a preferred embodiment based on a Schottky-barrier semiconductor diode, as an example. Other types of diodes may be used as well, e.g., PN junction diodes. Furthermore, the application of the diode coupled transmission lines arrangement is not restricted to suppressor and limiter circuits described above.

While the invention has been particularly shown and described with reference to a preferred embodiment thereof, it will be understood by those skilled in the art that the foregoing and other changes in form and detail may be made without departing from the spirit and scope of the invention.

I claim:

1. Coupled transmission lines arrangement comprising, in combination:
- a pair of transmission lines; and
- voltage sensitive means coupling said transmission lines having one state for directionally coupling said transmission lines and another state for nondirectionally coupling said transmission lines, said voltage sensitive means comprising a Schottky-barrier semiconductor diode.

2. Semiconductor diode coupling transmission lines arrangement comprising, in combination:
- input and output transmission lines;
- semiconductor diode means coupling said transmission lines to provide a directional coupling system which includes the parasitic elements of said diode, said coupling diode including a metal causing a Schottky-barrier in the semiconductor of said semiconductor diode; and
- said coupling diode means preventing the occurrence of noise signals at the output terminal of said output transmission line when said coupling diode is backward biased, and said coupling diode means transmitting an input pulse applied to the input of said input transmission line to the output of said output transmission line when said coupling diode is forward biased.

3. Semiconductor diode coupling transmission lines arrangement comprising, in combination:
- input and output transmission lines;
- semiconductor diode means coupling said transmission lines to provide a directional coupling system which includes the parasitic elements of said diode, said diode and electrodes thereof having an extension in a direction orthogonal to the current path which is in the order of the wavelength for high frequency operation; and
- said coupling diode means preventing the occurence of noise signals at the output terminal of said output transmission line when said coupling diode is backward biased, and said coupling diode means transmitting an input pulse applied to the input of said input transmission line to the output of said output transmission line when said coupling diode is forward biased.

4. Semiconductor diode coupling transmission lines arrangement comprising, in combination:
- input and output transmission lines;
- semiconductor diode means coupling said transmission lines to provide a directional coupling system which includes the parasitic elements of said diode, said coupling diode being established on a metallic substrate which serves as return line for said input and output transmission lines; and
- said coupling diode means preventing the occurrence of noise signals at the output terminal of said output transmission line when said coupling diode is backward biased, and said coupling diode means transmitting an input pulse applied to the input of said input transmission line to the output of said output transmission line when said coupling diode is forward biased.

5. Semiconductor diode coupling transmission lines arrangement comprising, in combination:
- input and output transmission lines;
- semiconductor diode means coupling said transmission lines to provide a directional coupling system which includes the parasitic elements of said diode, said coupling diode and said transmission lines including
  - a metallic substrate which serves as return line for said transmission lines,
  - an insulator layer on a surface of said metallic substrate,
  - a first metallic layer on said insulator layer and establishing with said metallic substrate one of said transmission lines,
  - a semiconductor layer on said insulator layer, and a second metallic layer on said semiconductor layer establishing therewith a Schottky-barrier diode, said second metallic layer establishing with said metallic substrate the other of said transmission lines; and
- said coupling diode means preventing the occurence of noise signals at the output terminal of said output transmission line when said coupling diode is backward biased, and said coupling diode means transmitting an input pulse applied to the input of said input transmission line to the output of said output transmission line when said coupling diode is forward biased.

6. Semiconductor diode coupled transmission lines arrangement as set forth in claim 5 wherein:
- said metallic substrate is aluminum;
- said insulator layer is $SiO_2$;
- said first metallic layer is gold;
- said semiconductor layer is *n*-type silicon; and
- said second metallic layer is aluminum.